United States Patent Office 3,328,239
Patented June 27, 1967

3,328,239
COMPOSITION AND METHOD FOR CONTROLLING BACTERIA WITH ORGANOTIN COMPOUNDS
Gerald A. Baum, New York, N.Y., and William J. Considine, Somerset, N.J., assignors to M & T Chemicals Inc., New York, N.Y., a corporation of Delaware
No Drawing. Filed May 7, 1963, Ser. No. 278,784
17 Claims. (Cl. 167—22)

This invention relates to the control of bacteria in aqueous systems and to novel bacteriostatic compositions.

Bacterial growth in aqueous systems has long been a serious problem. Bacteria, including gram negative and gram positive bacteria, may commonly exist and thrive in aqueous media. Industries which use such media containing bacterial nutrients may be beset by problems of contamination, slime formation, flow line blockages, odors and the like. For example, the papermaking industry, which employs large volumes of water, has experienced problems of slime formation, blockages, contamination, spotted and weak paper products, etc. Other areas wherein bacterial growth has proved troublesome are secondary oil recovery systems, cooling towers, etc.

Prior art attempts to solve these problems have not been completely satisfactory. Bacterial agents which have sufficient water solubility to produce some inhibitory action have not provided a broad enough spectrum of activity. Other agents, typically pentachlorophenol and the mercurials, may be highly corrosive to machinery and human skin, have excessive mammalian toxicity, etc. They may also be substantially insoluble in water, so that their use in aqueous systems is limited and unnecessarily complicated. Moreover, because of their insolubility they may form local deposits which may adversely affect the uniformity of treatment and thus leave large portions of the aqueous system without an adequate level of bacteriostat.

It is an object of this invention to provide a method for controlling bacteria in aqueous systems. It is a further object to provide novel bacteriostatic compositions. Other objects will be apparent to one skilled in the art upon reading the following disclosure.

In accordance with certain of its aspects, this invention relates to a method for controlling the growth of bacteria which comprises treating said bacteria with an aqueous solution of a material selected from the group consisting of

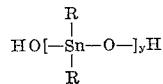

and alkali metal salts thereof; wherein R is selected from the group consisting of tert-butyl, tert-amyl and neopentyl; and y is 1–2. When y is 1, it will be apparent that the formula may be $R_2Sn(OH)_2$; when y is 2, it will be apparent that the formula may be

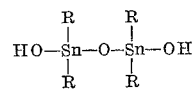

Practice of this invention permits control of a broad spectrum of bacteria, including Gram-negative and Gram-positive bacteria. Typical Gram-positive bacteria which may be controlled include *Staphylococcus aureus*, *Bacillus subtilis*, etc. It is a particular advantage of this invention that the highly resistant Gram-negative bacteria may be readily controlled. Typical Gram-negative bacteria include *Aerobacter aerogenes*, *Pseudomonas aeruginosa*, *Escherichia coli*, etc. Although the invention is primarily directed toward the control of these organisms growing in aqueous systems the novel water-soluble bacteriostatic compositions disclosed herein will also permit the attainment of advantages in other areas of use, especially in those areas wherein it is desired to apply a bacteriostat in conjunction with an aqueous diluent.

The bacteriostatic agent which may be used in the practice of this invention may be a material of the formula

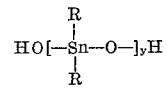

wherein R is a highly hindering alkyl radical, i.e. an alkyl radical which produces a greater degree of hinderance than the sec-butyl radical. Typically, the highly hindering radical R may be selected from the group consisting of the tert-butyl, tert-amyl, and neopentyl radicals. The preferred radicals may be the tert-amyl and tert-butyl radicals and the tert-butyl radical may be highly preferred.

The compounds which may typically find use in the practice of this invention may include di-tert-butyltin dihydroxide, di-tert-amyltin dihydroxide, di-neopentyl-tin dihydroxide, bis(hydroxy di-tert-butyltin)oxide, bis(hydroxy di-tert-amyltin)oxide, bis(hydroxy dineopentyltin) oxide, etc. Alkali metal salts of these materials may be employed if desired. Such salts may typically include potassium salts or sodium salts of di-tert-butyltin dihydroxide, di-tert-amyltin dihydroxide, dineopentyltin dihydroxide, bis(hydroxy di-tert-butyltin)oxide, bis(hydroxy di-tert-amyltin)oxide, bis(hydroxy dineopentyltin)oxide, etc. In general the dihydroxide compounds and their salts have greater solubility in water than the corresponding oxides and may, therefore, be preferred. Under certain circumstances, a mixture of dihydroxide and oxide may be preferred, di-tert-butyltin dihydroxide and mixtures thereof with bis(hydroxy di-tert-butyltin)oxide may be highly preferred.

The compounds of this invention may readily be prepared by reacting the corresponding dialkyltin dihalide with a base according to the following reaction:

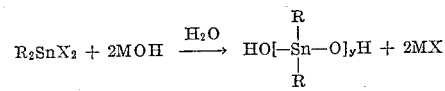

wherein R is as defined supra, X is halogen, preferably chlorine and M is a cation, preferably an alkali metal cation or ammonium. Reaction conditions are generally mild-temperatures of about 20–80° C. being suitable. Preferably, stoichiometric amounts of MOH may be employed. In freshly prepared product, y may approximate 1 and the product may be substantially $R_2Sn(OH)_2$. This product may generally be recovered in aqueous solution and the aqueous solution may be used directly in bacteriostatic compositions. Depending upon reaction conditions, materials having a higher value for y may be produced.

It may also be possible to obtain separate materials having a relatively high value for y (i.e. 1.4–2) and a relatively low value for y (i.e. 1–1.4) by fractional crystallization from a single reaction solution. For example, a reaction solution containing a mixture of the dihydroxide and the oxide may be cooled to yield a product which is predominantly oxide, i.e. which has a y value between 1.4 and 2. The remaining solution may then be concentrated and again cooled to yield a product which is predominantly dihydroxide, i.e. which has a y value between 1 and 1.4. Further purification by fractional crystallization may be employed to produce substantially pure oxide or substantially pure dihydroxide. In this manner, compositions having y values over the entire range of 1–2 may be prepared as desired.

The compositions wherein y is greater than 1 may also be prepared by drying an aqueous solution of $R_2Sn(OH)_2$ and further dehydrating this compound as, for example:

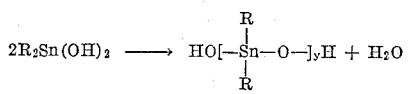

$$2R_2Sn(OH)_2 \longrightarrow HO[-\underset{\underset{R}{|}}{\overset{\overset{R}{|}}{Sn}}-O-]_yH + H_2O$$

wherein $y$ is greater than 1, say 1.2–2. Extreme dehydrating conditions may lead to further polymerization, i.e. products wherein $y$ is greater than 2, which products may have reduced solubility. Preferably, the dehydrating conditions may be mild so that $y$ may be maintained between 1 and 2 and the water solubility of the compounds may be maintained at a high level. Most preferably, $y$ will be 1.0–1.5. Typically, the compounds may be dried at a temperature of 25–100° C. preferably 25–50° C., say 40° C. at a pressure of 5–760 mm., preferably 5–30 mm., say 15 mm. If desired, a moving current of air may be used to accelerate dehydration. Techniques such as freeze-drying may be advantageously employed. Where the dehydrating conditions are very mild, the resulting product may typically comprise a mixture of the dihydroxide and the oxide wherein $y$ may have a value close to 1, e.g. 1.1–1.5. Values of y between about 1.0 and 1.5 may be obtained when the mixture of dihydroxide and oxide contains about 50–100 mole percent dihydroxide. When the drying conditions are less mild, the product may comprise a mixture wherein $y$ has a value closer to 2, e.g. 1.5–2. Values of $y$ between 1.5 and 2 correspond to mixtures containing less than 50 mole percent, e.g. 0–500 mole percent dihydroxide.

Alkali metal salts of these materials may typically be prepared by adding to an aqueous solution of the dihydroxide or the oxide, a base, typically alkali metal hydroxide. The amount of base added may typically be an equivalent amount, although lesser amounts may also be employed. An equivalent amount may be one mole of base per mole of free hydroxyl groups attached to the tin atom. Where less than an equivalent amount of base is employed, the product may comprise mixtures of the mono-salts and di-salts, etc. For example, the potassium salt of di-tert-butyltin dihydroxide may be prepared by adding 2 moles of potassium hydroxide to 1 mole of di-tert-butyltin dihydroxide in aqueous solution. The potassium salt may be obtained as a solid by removing the water and drying. The structure of the salt may typically be $R_2Sn(OM')_2 \cdot H_2O$ wherein M' is an alkali metal. Other structures (higher or lower hydrates, etc.) may also exist. These novel salts are characterized by a high rate of solution, a high solubility and improved stability of aqueous solutions thereof to changes in pH.

The amount of bacteriostatic agent which may be used to control the growth of bacteria may vary, depending upon the organism treated, the surrounding conditions, the particular agent chosen, etc. Typically, a concentration of at least 1 p.p.m. by weight bacteriostat based on the weight of the aqueous system may be employed. Typically, the bacteriostat may be used in the concentration of 1–500 p.p.m., preferably 5–50 p.p.m., say 25 p.p.p. Larger amounts, up to the limit of solubility, may be employed, but no apparent advantage may accompany the use of such excess amounts.

The bacteriostatic agents of this invention may be added to the aqueous system as a solid or as a concentrated solution (e.g. the solution formed as a reaction product). Where it is added in concentrated solution, it may be simply mixed into the aqueous system with moderate agitation. A concentrated aqueous solution may typically comprise 1–10% say 5% by weight of bacteriostat. Where the highly water-soluble compounds of this invention e.g. di-tert-butyltin dihydroxide, are employed, the concentrated aqueous solution may contain as much as about 10% by weight bacteriostat.

Where the bacteriostatic agents of this invention are added as solid compound, they may be dusted into the aqueous system and dispersed therein, with or without the use of small amounts of wetting agent. Small quantities of water-miscible organic solvents, e.g. tetrahydrofuran, may be mixed with the bacteriostat prior to the addition to the aqueous system to aid in wetting-out and dissolution. Alternately, sufficient water-miscible organic solvent may be employed to give a clear, stable solution of bacteriostat which may readily be diluted with water. The use of tetrahydrofuran for this purpose is especially preferred. Solutions of the compounds of this invention in tetrahydrofuran are novel, highly convenient, water-dispersible bacteriostatic compositions. Typically, these solutions may comprise about 1–20%, preferably 1–10%, say 5% bacteriostat. When diluted with water, these novel compositions form clear, stable solutions of bacteriostat.

Practice of this invention may be further illustrated by reference to the following examples.

*Example 1*

10 grams (0.033 mole) of di-tert-butyltin dichloride were dissolved in 150 cc. of cyclohexane. This solution was added, with rapid stirring, to a solution of 0.066 mole of potassium hydroxide in 160 cc. of water. The mixture was stirred for 2 hours and allowed to stand overnight. The layers were separated and the cyclohexane layer discarded. A first quantity of product was obtained by crystallizing out a portion of the product. This first quantity had a tin analysis of 45.4% and a molecular weight of 365. Based on these analyses, this product had a $y$ value of about 1.4–1.44.

The remaining aqueous solution was concentrated to 50 cc. and a second quantity of product was isolated therefrom. This second quantity gave a tin analysis of 45.0%, corresponding to a $y$ value of about 1.2. Total yield of product from the reaction was substantially quantitative.

*Example 2.—Potassium salt of di-tert-butyltin dihydroxide*

A solution of 3.0 grams (0.0125 mole) of the second product of Example 1 dissolved in 50 cc. of tetrahydrofuran and 50 cc. of water was treated with 0.025 mole of KOH. The reaction solution was evaporated to dryness on a steam bath to give 4.0 grams of white product.

Analysis for $(C_4H_9)_2Sn(OK)_2$: Theory percent K, 22.7. Found percent K, 21.1.

In order to demonstrate the highly unexpected activity of the compounds of this invention, the following comparative experiments were performed.

Solutions of dibutyltin diacetate and the potassium salt of di-tert-butyltin dihydroxyide (from Example 2) were prepared by dissolving one gram of each compound in 10 cc. of tetrahydrofuran. These solutions were then each separately diluted to 100 cc. with distilled water. An aliquot amount of the resulting stock solution of di-tert-butyltin dihydroxide was added to a nutrient broth to give a concentration therein of 100 parts per million of organotin compound. An equal aliquot of the stock preparation of dibutyltin diacetate was added to the same quantity of another nutrient broth. Portions of the first broth were diluted to obtain nutrient broths having concentrations of 3, 6, 12, 25, 50, and 100 parts per million of organotin compound. In similar manner, portions of the second broth were diluted to obtain the more diluted broths.

Separate portions of the broths were then inoculated with *Staphylococcus aureus*, *Aerobacter aerogenes*, and *Pseudomonas aeruginosa*. The first of these bacteria is Gram-positive and the other two are Gram-negative. The inoculated broths were incubated at 37° C. for 48 hours, after which they were visually examined for bacterial growth. The lowest concentration in parts per million at which bacterial growth was inhibited is recorded in Table I, infra. When complete inhibition was not obtained at the highest concentration used (100 p.p.m.) the result is recorded as 100. Thus, the most active bactericides are characterized by the smallest numbers in this table.

TABLE I

| Compound | S. aureus | A. aerogenes | P. aeruginosa |
|---|---|---|---|
| Potassium salt of ditert-butyltin dihydroxide | 3 | 6 | 24 |
| Di-tert-butyltin dihydroxide ($y = 1.2$) | 8 | 8 | 31 |
| Dibutyltin diacetate | 50 | >100 | >100 |

From Table I it may be seen that the novel compounds of this invention are particularly characterized by their surprising and unexpectedly high activity in aqueous systems. Other compounds of this invention, e.g. di-tert-amyltin dihydroxide, bis(hydroxy di-tert-butyltin)oxide, and mixtures of the hydroxides and corresponding oxides may also be used in the above-noted test and found to give substantially the same results as the potassium salt of di-tert-butyltin dihydroxide.

Although this invention has been illustrated by reference to specific embodiments, modifications thereof which are clearly within the scope of the invention will be apparent to those skilled in the art.

We claim:

1. The method for controlling the growth of bacteria which comprises treating said bacteria with an aqueous solution of a material selected from the group consisting of

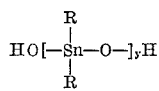

and alkali metal salts thereof; wherein R is selected from the group consisting of tert-butyl, tert-amyl, and neopentyl; and $y$ is 1–2.

2. The method for controlling the growth of bacteria as claimed in claim 1 wherein $y$ is 1–1.5.

3. The method for controlling the growth of bacteria which comprises treating said bacteria with an aqueous solution containing 1–500 p.p.m. by weight of a material selected from the group consisting of

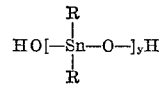

and alkali metal salts thereof; wherein R is selected from the group consisting of tert-butyl, tert-amyl, and neopentyl; and $y$ is 1–2.

4. The method for controlling the growth of bacteria as claimed in claim 3 wherein R is tert-butyl.

5. The method for controlling the growth of bacteria as claimed in claim 3 wherein R is tert-amyl.

6. The method for controlling the growth of bacteria as claimed in claim 3 wherein said material comprises di-tert-butyltin dihydroxide.

7. The method for controlling the growth of bacteria as claimed in claim 3 wherein $y$ is 1–1.5.

8. A novel water-dispersable bacteriostatic composition comprising tetrahydrofuran and a material selected from the group consisting of

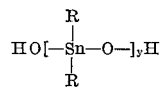

and alkali metal salts thereof; wherein R is selected from the group consisting of tert-butyl, tert-amyl and neopentyl; and $y$ is 1–2.

9. A novel water-dispersible bacteriostatic composition comprising a 1–20% by weight solution in tetrahydrofuran of a material selected from the group consisting of

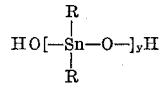

and alkali metal salts thereof; wherein R is selected from the group consisting of tert-butyl, tert-amyl, and neopentyl; and $y$ is 1–2.

10. A novel composition as claimed in claim 9 wherein R is tert-butyl.

11. A novel composition as claimed in claim 9 wherein R is tert-amyl.

12. A novel composition as claimed in claim 9 wherein said material comprises di-tert-butyltin dihydroxide.

13. A novel composition as claimed in claim 9 wherein $y$ is 1–1.5.

14. A novel composition comprising an alkali metal salt of a material of the formula

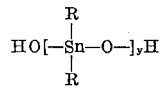

wherein R is selected from the group consisting of tert-butyl, tert-amyl and neopentyl; and $y$ is 1–2.

15. A novel composition as claimed in claim 14 wherein $y$ is 1–1.5.

16. A novel composition as claimed in claim 15 wherein R is tert-butyl.

17. A novel composition as claimed in claim 15 wherein the alkali metal salt is a potassium salt.

References Cited

UNITED STATES PATENTS 2,984,669   5/1961   Brahler et al. _____ 260—307

FOREIGN PATENTS 734,119   7/1955   Great Britain.

OTHER REFERENCES

Van der Kerk et al., J. Appl. Chem., vol. 4, June 1954, p. 314.

Chemical Review, American Chem. Soc., vol. 60, No. 5, October 1960, p. 493.

ALBERT T. MEYERS, *Primary Examiner.*

GEORGE A. MENTIS, *Assistant Examiner.*